United States Patent [19]
Krämer

[11] Patent Number: 6,062,080
[45] Date of Patent: *May 16, 2000

[54] APPARATUS AND METHOD FOR DETERMINING TRAVEL DATA OF A TRAVEL DEVICE

[75] Inventor: Helmut Krämer, Neustadt, Germany

[73] Assignee: Sigma-Elektro GmbH, Neustadt, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/834,000

[22] Filed: Apr. 11, 1997

[30] Foreign Application Priority Data

Apr. 11, 1996 [DE] Germany ............ 196 14 310

[51] Int. Cl.[7] .................................................. G01P 1/00
[52] U.S. Cl. ........................................ 73/490; 235/95 R
[58] Field of Search .................... 73/490; 324/173–175; 235/95 R, 96

[56] References Cited

U.S. PATENT DOCUMENTS

| | | | |
|---|---|---|---|
| 2,354,708 | 8/1944 | Segal | 235/95 |
| 4,454,411 | 6/1984 | Hale et al. | 235/95 |
| 4,546,650 | 10/1985 | Cameron | 73/490 |
| 4,860,585 | 8/1989 | Tuyn et al. | 73/490 |
| 4,864,860 | 9/1989 | Manseth | 73/490 |
| 5,721,539 | 2/1998 | Goetz | 235/95 R |

FOREIGN PATENT DOCUMENTS

| | | |
|---|---|---|
| 0192172 | 8/1986 | European Pat. Off. |
| 0316888 | 5/1989 | European Pat. Off. |
| 0576070 | 12/1993 | European Pat. Off. |
| 9209825 | 10/1992 | Germany |
| 9209825 | 11/1992 | Germany |
| 29616211 | 11/1996 | Germany |
| 7-103787A | 4/1995 | Japan |
| 9519548 | 7/1995 | WIPO |

Primary Examiner—Robert Raevis
Attorney, Agent, or Firm—Antonelli, Terry, Stout & Kraus, LLP

[57] ABSTRACT

The invention is a method and an apparatus for determining travel data of a travel device when wheels or rollers of the travel device intermittently have ground contact. The apparatus has an odometer on at least one measuring roller. For the correct determination of the travel data, there is a correcting device for correcting the path length measured by the odometer in the case of interruptions of the ground contact of the measuring roller. In the case of established, sporadic interruptions of ground contact, the measured path length is corrected for obtaining the actually covered path length.

46 Claims, 7 Drawing Sheets

APPARATUS AND METHOD FOR DETERMINING TRAVEL DATA OF A TRAVEL DEVICE

BACKGROUND OF THE INVENTION

1. Field of the Invention

The invention relates to an apparatus and a method for determining travel data of a travel device whose wheels or rollers do not always have ground contract, with a path measuring device or odometer on at least one roller, namely a measuring roller.

2. Description of the Prior Art

Numerous travel or movement devices exist, particularly for sport purposes, but also for movement purposes, such as roller skates and in particular inline skates, in which the rollers do no permanently have contact with the ground. If the rollers of such travel devices are to be used for determining travel data, such as in particular the path length covered and from which with an additional time measurement it is possible to derive an average speed, it is far from easy to obtain correct data, because the "apparent" path covered in the case where there is no ground contact through the rotary path of the outer circumference of the rollers used for path measurement purposes is not identical to the path actually covered and instead significant errors occur.

Thus, when skating by means of inline skates, i.e. sport devices equipped with four or more rollers arranged successively in a line and mounted in ball bearings, a distinction is made between two movement types. These are on the one hand by rolling movement and on the other by running movement. When rolling both skates are in contact throughout the rolling phase with the ground. However, when running alternately the right and left skate are in contact with the ground. Thus, when rolling, the precisely covered path length is given by the distance covered by the rollers of the inline skate, whereas when running for each skate there is a partial path length where this does not apply.

SUMMARY OF THE INVENTION

The problem solved by the invention is to provide an apparatus and a method of the aforementioned type, by means of which it is possible to reliably determine path data for travel devices not always in contact with the ground.

According to the invention, this problem is solved in an apparatus of the aforementioned type, which is characterized by a correcting device for correcting the path length measure by the odometer in the case of interruptions of the ground contact of the measuring roller. A method according to the invention is characterized in that in the case of the detection of sporadic interruptions of ground contact, the measured path length is corrected to obtain the actually traveled path length.

Firstly the rotary path length of the measuring roller is determined, e.g. by measuring the number of revolutions. In this way in the case of contact between the measuring roller and the ground it is possible to determine the path length covered by the rollers, i.e. the "rolled" path length. If the travel device regularly loses ground contact, then during the lifting of the travel device from the ground it is not possible to determine the path length covered by means of the revolutions of the measuring roller. Thus, according to the invention, in this case the measured or rolled path length is corrected to obtain the actual path length. It is necessary to increase the measured or rolled path length. As a result the actually traveled path length can be very accurately determined. In the case of skates, especially inline skates, an increase of 15 to 30%, i.e. a multiplication by 1.15 to 1.3 has proved appropriate. The value can be individually adapted.

On lifting the travel device from the ground, it is regularly inclined or titled. Thus, according to preferred embodiments of the invention, the correcting device has a tilt switch (inclinometer) or vibration switch and the tilt or inclination of the travel device perpendicular to its running/rolling direction is determined to establish whether the measuring roller no longer has ground contact. As the skates are tilted during the running movement compared with the orientation when rolling, i.e. the rolling direction, a device detecting a tilt indicating a running step with respect to the skate rolling direction can pass a corresponding signal to a data processing unit, so that when determining the path length covered a clear distinction can be made between the ran path length and the rolled path length.

However, it has been found that on lifting the travel device from the ground, a pressure relief occurs thereto. Thus, according to other preferred embodiments of the invention, the correcting device has a pressure switch through which the interruption of the pressure exerted on the travel device in the case of ground contact is determined, in order to establish that the measuring roller no longer has ground contact.

As a result of the two detection types or devices, it is possible to associate the data measured by a chronometer and a device for determining the revolutions of a roller with one of the two movement types, so that their evaluation can take place in accordance with the circumstances occurring with the two different movement types. It has surprisingly been found that it is merely necessary to detect the tilt or pressure relief of the skate and optionally measure the elapsed time and the number of revolutions of the roller. In addition, the roller circumference is required, but this can be stored from the outset in the data processing unit. On the basis of this data, it is then not only possible to determine the path length covered, the travel time and the instantaneous speed, but also the maximum and average speed and optionally further values derived therefrom.

The device for detecting the tilt or inclination of the travel device perpendicular to its movement direction is preferably a movement or tilt switch. Such a switch reliably indicates whether or not there is a tilt. Since during the running step of a skate, including a roller skate, there can be a tilt of 0° (the rollers are parallel to the ground) and up to approximately 50° (the tip of the inline skate points in the direction of the ground), the tilt or movement switch must be tiltable. For this purpose the tilt switch is preferably settable and lockable by means of a setscrew.

If a pressure switch is used for determining a movement or running step, it is preferably located in a shoe or boot connected or connectable to the travel device. Correspondingly the pressure contact by the foot and the weight of the skater are reliably obtained in the case of ground contact. According to a further embodiment, the inner switch is positioned between the inner boot and the sole of the boot, preferably in the area below the heel. However, the pressure switch can also be located directly below the heel. Thus, it is precisely in this area that on lifting the skate, pressure relief occurs in the travel device, and therefore in the pressure switch in the boot.

The odometer on the measuring roller is preferably a reed switch. With such a switch the switching process can be initiated by external magnets. For this purpose, in a preferred embodiment the reed switch cooperates with a magnet fixed eccentrically to the measuring roller. Thus, following a complete revolution of the measuring roller, the magnet fixed thereto initiates a switching process in the reed switch, which supplies a pulse to the data processing unit. The magnet can be a bar magnet made from an aluminum-nickel-cobalt alloy known as Alnico 500, or a neodymium magnet, the magnet being locatable in the spoke system of the measuring roller, in its rim or in the tire (the plastic ring mounting on the rim). As a result of this magnet arrangement and the use of a reed switch, a reliable detection of roller revolutions is ensured.

According to a preferred embodiment, the odometer and correcting device are combined in a sensor unit, which is formed by an assembly receiving the functional elements thereof. This assembly is correspondingly placed on the travel device, particularly on its chassis, so that on the one hand the tilt and on the other the roller revolutions can be accurately detected. Alternatively the odometer and correcting device can be located in separate assemblies or sensor units. This is particularly the case when using a pressure switch. Preferably for this purpose at least one assembly has legs bent towards one another. As a result of this bending it is possible to place the assembly in space-saving manner, e.g. at the tip of the chassis, which is tilted, or the assembly can be located in the vicinity of the rollers. In order to fix the assembly immovably and firmly to a travel device, such as a skate, it preferably has a fastening device, which according to a further embodiment can be formed by a leg having a slot. As a result of this construction the assembly can be positioned by means of the slot in the vicinity of the bearing bush of the roller and can then be jointly fixed with the roller to the chassis. By means of the slot the assembly can also be adjusted in this area. The leg having the slot can be bent with respect to the reed switch, or the slot can be located in the same assembly leg as the reed switch, and then the tilt switch is located in the other leg. Preferably, the reed switch is positioned between the tilt switch and the fastening device. However, it is also possible for the fastening device to be positioned between the reed switch and the tilt switch, fastening being possible by screwing or also by other fastening means such as adhesive pads and the like. In another preferred embodiment, the sensor and display are constructionally separated, the sensor having a transmitter and the display a receiver. The data processing unit can be constructionally combined either with the sensor or the display. The display is preferably carried on the wrist, e.g. by means of a Velcro tape, a cuff, etc.

According to a preferred embodiment, the data processing unit is a unit which can be placed on the travel device. It preferably has displays for outputting the calculated data and these can e.g. be LCD's. It is thus possible to directly read off from the inline skate of the user what path length has been covered. Additionally it is possible to provide displays for outputting the speed, etc. According to a further embodiment, the data processing unit is located on a sensor base, the base preferably being fixed to a shoe or boot connected or connectable to the travel device. As a result the data processing unit can be housed in a space-saving manner and furthermore its displays can be directly read off the boot. However, it is possible to place the sensor base on a holder fixable to the travel device, the holder being preferably so constructed that it can be reliably fixed between the boot and the chassis of the travel device. It is possible for the holder to engage over the boot either laterally or at its tip or toe. The sensor unit can also be provided with a transmitter and the data processing unit with a receiver, so that the latter can be carried by the user, e.g. on the boot.

According to a further embodiment, the assembly can be articulated to the sensor base. Thus, the assembly and the base can be oriented with respect to one another in accordance with the given circumstances.

As a result of the apparatus according to the invention it is possible to very accurately determine the path length covered by the rolling and running movement of the travel device, even if it loses ground contact. In the case of roller skates in the broadest sense, said apparatus need only be provided on one of the two skates.

Since during the rolling movement the distance covered is the same as that covered by the rollers, the path length covered during rolling movement is determined through the number of revolutions of the roller multiplied by the stored roller circumference. During running movement, the effectively covered path length is constituted by the path measurable via the number of revolutions of the rollers plus a distance during which the rollers have had no contact with the ground. As it has been surprisingly found that during roller skating there is an almost regular running rhythm and that the distance traveled between rolling contact of two skates roughly corresponds to 15 to 30% of the rolled distance, according to a preferred embodiment the roller circumference during the detection of a tilt indicating a running step or an interruption of the pressure contact is provided with a correction value leading to an increase in the measured path of 15 to 30% of the roller circumference. The increased value in question can be individually adjusted. Thus, the effectively covered distance results from the distance measured by the rotation of the measuring roller and the distance given by the correction value. Thus, it is possible to determine the actually covered path length from the effectively run distance and the effectively rolled distance of the travel device or roller skate.

As it has been found that the time interval for a running step is a maximum of three seconds, preferably the correction value on detection of a running step is retained for three seconds. If there is no further detection of a running step, no further signal from the tilt switch or a pressure contact signal is routed to the data processing unit, and consequently there is no correction value and the determination of the path length covered once again takes place taking account the number of revolutions of the measuring roller and the stored roller circumference. It is obviously possible, apart from a pure path length calculation, also to use the measured time value to calculate the speed of the inline skate and output the same via the data processing unit display. It must be borne in mind that for a continuous display of the speed in kilometers per hour, there can only be a renewal of the display by the LCD every two seconds. The speed display during the running step is to be taken over from that during the rolling movement, because the path covered during rolling or running lasts approximately the same time.

It is therefore alternatively possible to establish the path length covered during running by means of the speed determined during rolling. Thus, the rolling speed is determined from the inputted wheel circumferences, the time passed during rolling and the number of revolutions of the measurement rollers. As soon as the tilt switch or pressure switch detects an interruption of ground contact, the speed determination is immediately interrupted until a rolling movement again takes place. The path length covered during running is then determined from the now constant speed and the measured time. The measured path length is then replaced by this determined path length and is consequently corrected. After recommencing the rolling movement, when once again a running step is detected, the rolling speed is again determined as at the outset.

Apart from the display of kilometers per day, total kilometers and the measured travel time, the data processing unit can have additional displays, e.g. the maximum speed and average speed, which can also be determined from the detected and measured data and the inputted roller circumferences.

Thus, according to a preferred embodiment, by means of the method according to the invention on lifting the roller skate, such as an inline skate, from the ground, due to the resulting tilt of the travel device by means of a tilt or vibration switch this circumstance is detected. Alternatively the interruption of the pressure contact in such a case is detected. The rollers, particularly also a measuring roller of the raised travel device, slow down their rotational speed and possibly stop, as a function of their bearing quality. However, the user continues to move on the other travel device, such as the other inline skate, for a considerable distance, which is no longer correctly measured by the measuring roller solely located on the raised travel device. Thus, the path indicated by the rotational speed by the raised measuring roller must be increased in order to obtain a sufficiently correct path. For this purpose the measuring roller circumference is fictitiously increased during the further calculation. This takes place for a period of preferably a maximum of three seconds. It has been found that within this time a raised foot must be lowered again and consequently the rollers of the corresponding travel device, including the measuring roller, are then brought to the actual rolling speed. On again raising the device, the correction process is repeated.

BRIEF DESCRIPTION OF THE DRAWINGS

Further advantages and features of the invention can be gathered from the claims and following description of embodiments of inline skates and with reference to the attached drawings, wherein:

In FIGS. 1 to 11 the same parts are given the same reference numerals.

DESCRIPTION OF THE PREFERRED EMBODIMENTS

Figure 1:
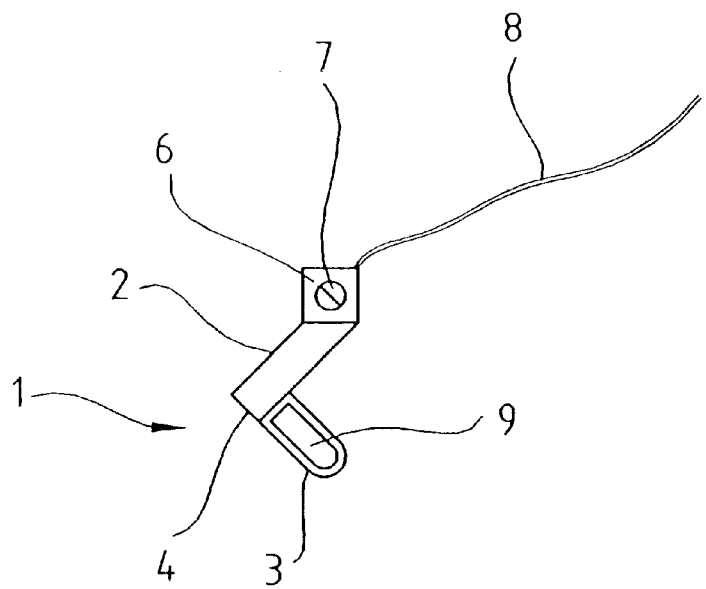
FIG. 1 shows a sensor unit according to the invention in a side view.

The embodiment of the sensor unit assembly 1 shown in FIG. 1 has two legs 2, 3 bent at right angles to one another. In or on the leg 2 is placed a reed switch 4 by means of which the number of revolutions of a measuring roller 5 (cf. FIG. 2) of an inline skate 23 can be detected. At the upper end of the leg 2 is provided a tilt switch 6, which can be set and locked by means of a setscrew 7. The sensor unit 1 is connected by means of a four-wire cable 8 to a data processing unit not shown in FIG. 1. A slot 9 is formed in the leg 3 located on the end of leg 2 remote from the tilt switch 6. By means of the slot 9 the assembly or sensor unit 1 can be fixed to the measuring roller 5 or 5' of a chassis 10 of an inline skate 23. For this purpose the leg 3 with the slot 9 therein is positioned in the vicinity of the bearing bush 11 (cf. FIG. 3) of the measuring roller 5 and can then be fixed with the latter to the chassis 10, such as to the axle of a wheel. Through the slot 9 it is possible to adjustably position the sensor unit 1 with respect to the measuring roller 5 or 5'.

Figure 2:
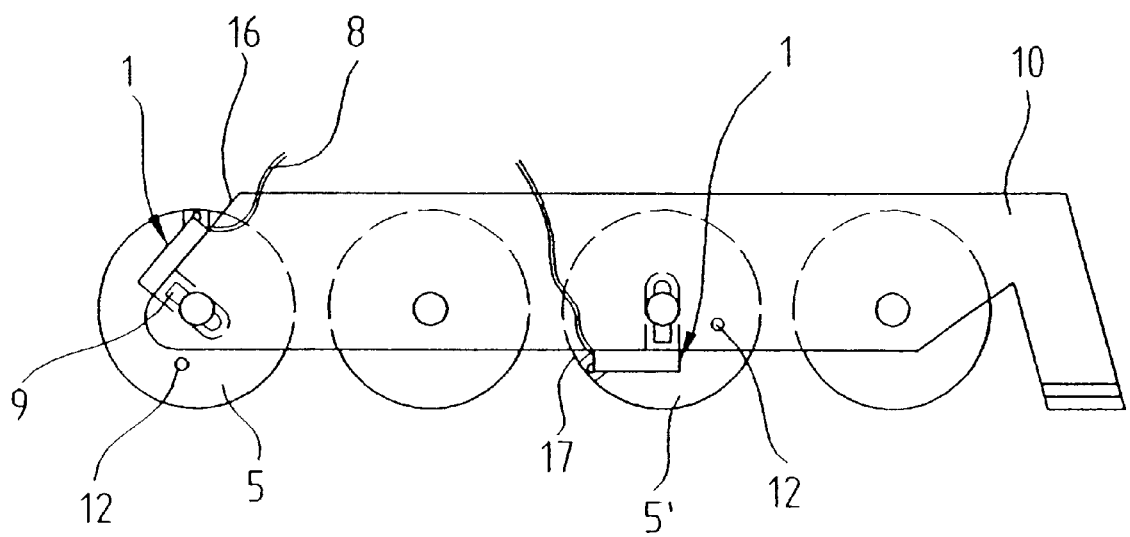
FIG. 2 shows the chassis of an inline skate with the sensor unit thereon.

As can in particular be gathered from FIG. 2, the sensor unit 1 can be placed on any of the four rollers of the associated inline skate. It is important that the reed switch 4 come into the action range of a magnet 12 located on the measuring roller 5.

Figure 3A:
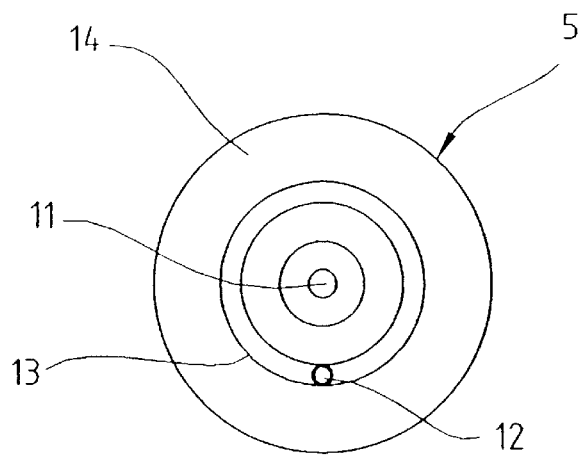
FIGS. 3a and 3b show a measuring roller of an inline skate in a side and a front view respectively, with the magnet located thereon.
Figure 3B:
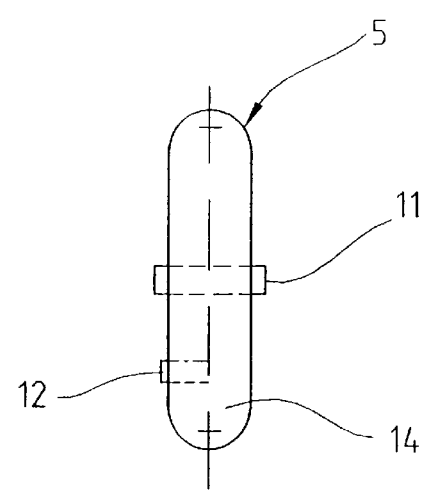
Figure 4:
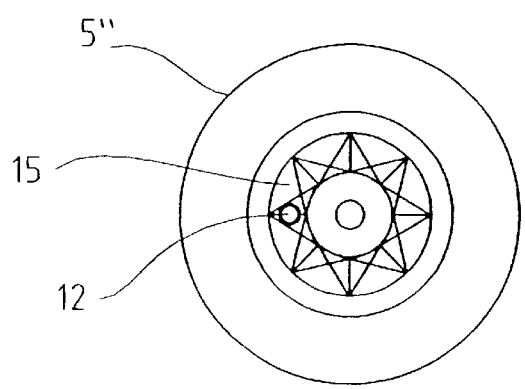
FIG. 4 shows another embodiment of a measuring roller, with the magnet located thereon, in side view.

The magnet 12, which is made from neodymium or a material known under the trade name Alnico 500, as can be gathered from FIGS. 3a and 3b, is positioned in the vicinity of the rim 13 from the polyurethane wheel 14 of the measuring roller 5. As shown in FIG. 4, the magnet 12 can also be positioned in the vicinity of the spoke system 15 of the measuring roller 5".

As shown in FIG. 2, the sensor assembly 1 is so fixed to the chassis 10 or measuring rollers 5, 5', that only the leg 3 with the slot 9 is positioned in the vicinity of the chassis 10, whereas the leg 2 having the other functioning elements, such as the tilt switch 6 and reed switch 4, is located outside the chassis 10, but parallel to its face 16 or underside 17.

Figure 5:
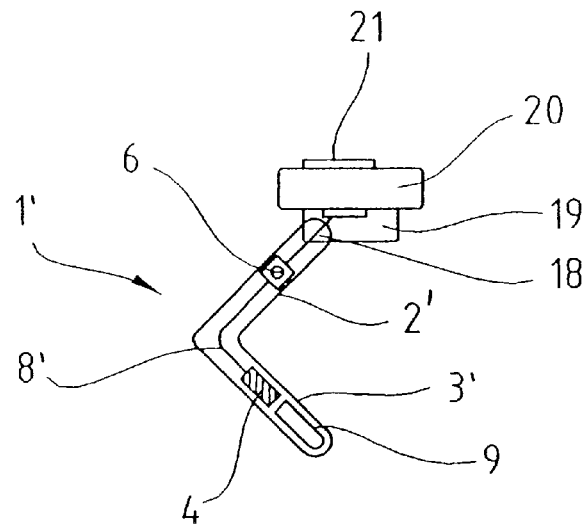
FIG. 5 shows another embodiment of a sensor unit with a data processing unit thereon.

In the second embodiment of a sensor unit shown in FIG. 5 the assembly 1' has two legs 2', 3' bent at an angle of 120°. On the leg 2' is located the tilt switch 6, whereas the reed switch 4 with the slot 9 is located in or on the leg 3'. Within the plastic legs 2', 3' is provided the cable 8' for connection to the data processing unit.

Whereas in the first embodiment shown in FIGS. 1 and 2 the sensor unit 1 is separately connected via the four-wire cable 8 to a data processing unit located on the inline skate, e.g. in its shoe or boot 22, in the second embodiment according to FIG. 5, the leg 2' is articulated by its free end 18, remote from the leg 3', to a sensor base 19. To the sensor base 19 is then fitted the data processing unit 20, whose top surface has displays 21 for outputting the speed, travel time and path length covered.

Figure 6:
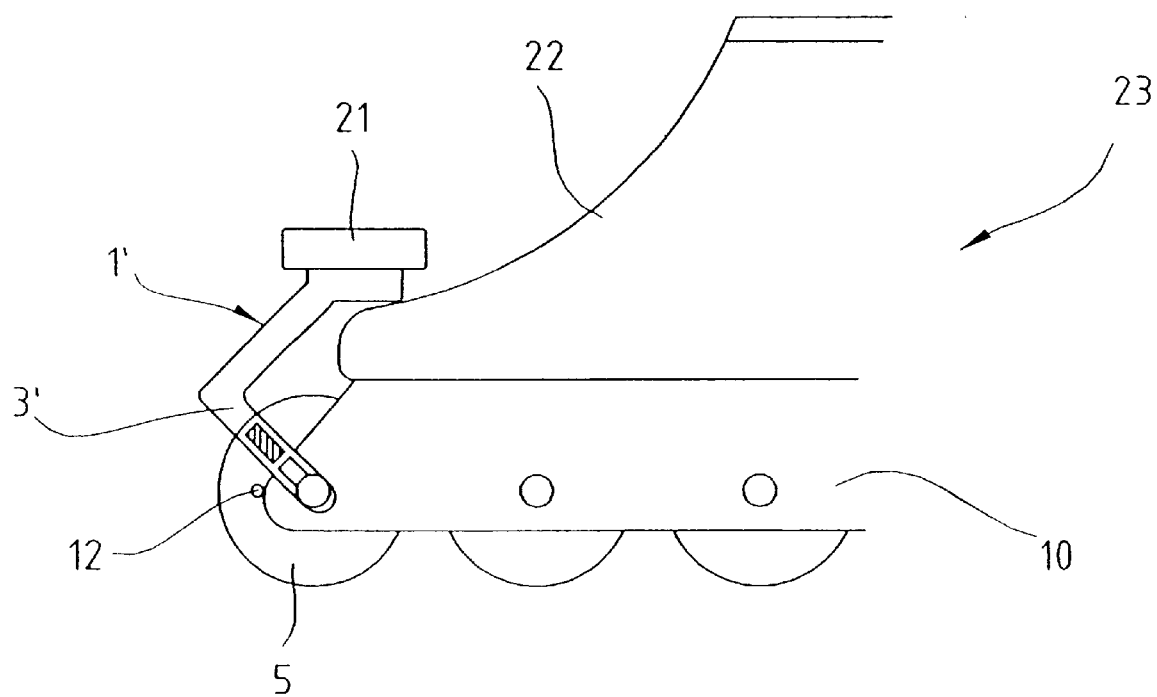
FIG. 6 shows the arrangement of the unit of FIG. 5 on an inline skate.

Whereas the sensor unit 1 of FIGS. 1 and 2 can be fixed to different rollers 5 or 5' of the chassis 10, the senor unit 1' can only be placed on the front roller 5. Once again fixing takes place by means of the slot 9. Due to the construction of the legs 2' and 3' and their mutual bending by 120°, the boot 22 of the inline skate 23, partly shown in FIG. 6, is so over-engaged at its front by the assembly 1' that the displays 21 of the data processing unit 20, namely a minicomputer, can be read from above. The assembly 1' is fixed to axle supporting roller 5.

Figure 7:
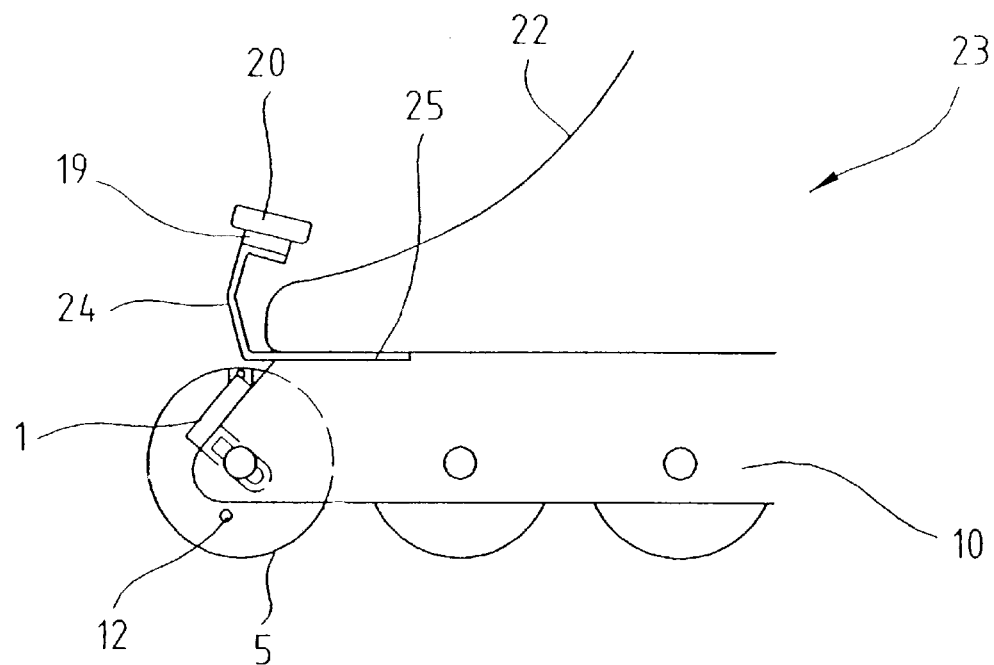
FIG. 7 shows the sensor unit of FIG. 1 located on the chassis of an inline skate, as well as a special mounting for fixing the data processing unit to the inline skate.

In the embodiment of FIG. 7 once again use is made of the assembly 1 shown in FIG. 1. The assembly 1 is placed on the chassis 10 separately from the data processing unit 20, but is connected to the latter via the cables 8. The data processing unit 20 and sensor base 19 are fitted to a holder 24 engaging over the front of the boot 22 and which is secured by its free leg 25 between the boot 22 and the chassis 10 and as a result is fixed. The boot 22 and chassis 10 are fixed to one another by screwing.

Figure 8:
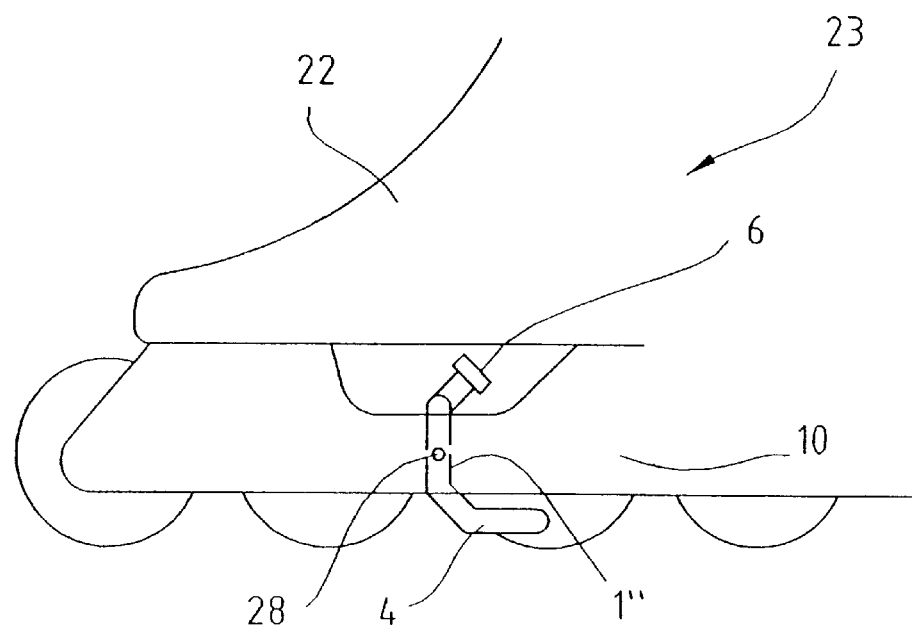
FIG. 8 shows another embodiment of an inventive sensor unit and its arrangement on the chassis of an inline skate.
Figure 9A:
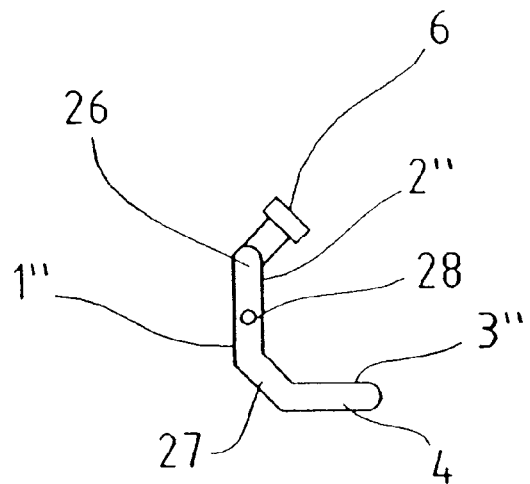
FIGS. 9a and 9b show the sensor unit of FIG. 8 in a side and a front view, respectively.
Figure 9B:
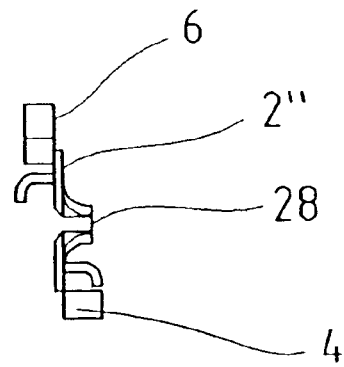

In the third embodiment of an assembly 1" shown in FIGS. 8, 9a and 9b, it once again has two legs 2", 3" bent against one another, the leg 3" in this embodiment being bent by 90° with respect to the leg 2" by means of a spacer 27. For this purpose the spacer 27 is firstly bent relative to the leg 2" by 45° and the leg 3" relative to the spacer 27 also by 45°. In or on the leg 3" is once again provided the reed switch 4. On the free end 26 of the leg 2", remote from the leg 3", is adjustably articulated the tilt switch 6. Roughly centrally in the leg 2" is provided the fastening device 28 for fastening the assembly 1" to the chassis 10 of the inline skate 23. The fastening device 28 can be constructed in the form of a base, by means of which the leg 2" can be fixed to the chassis 10 by screwing and interposing rubber rings.

Figure 10:
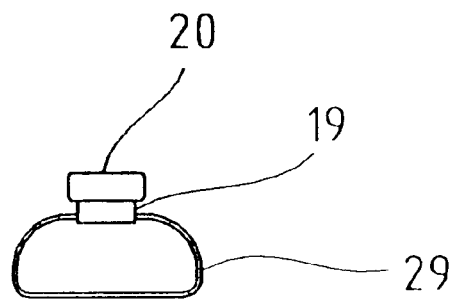
FIG. 10 shows another holder for the data processing unit in a front view.

FIG. 10 shows another embodiment for a holder 29 for carrying the sensor base 19 and the data processing unit 20. This embodiment relates to a holder 29 in the form of a clip, clamp or Velcro tape, which can once again be fixed between the boot and inline skate chassis. The clip 29 passes round the boot toe and is held by clamping between the chassis and the boot. The sensor unit can once again be constituted by the unit 1 shown in FIG. 1 or the unit 1" shown in FIG. 9.

Figure 11:
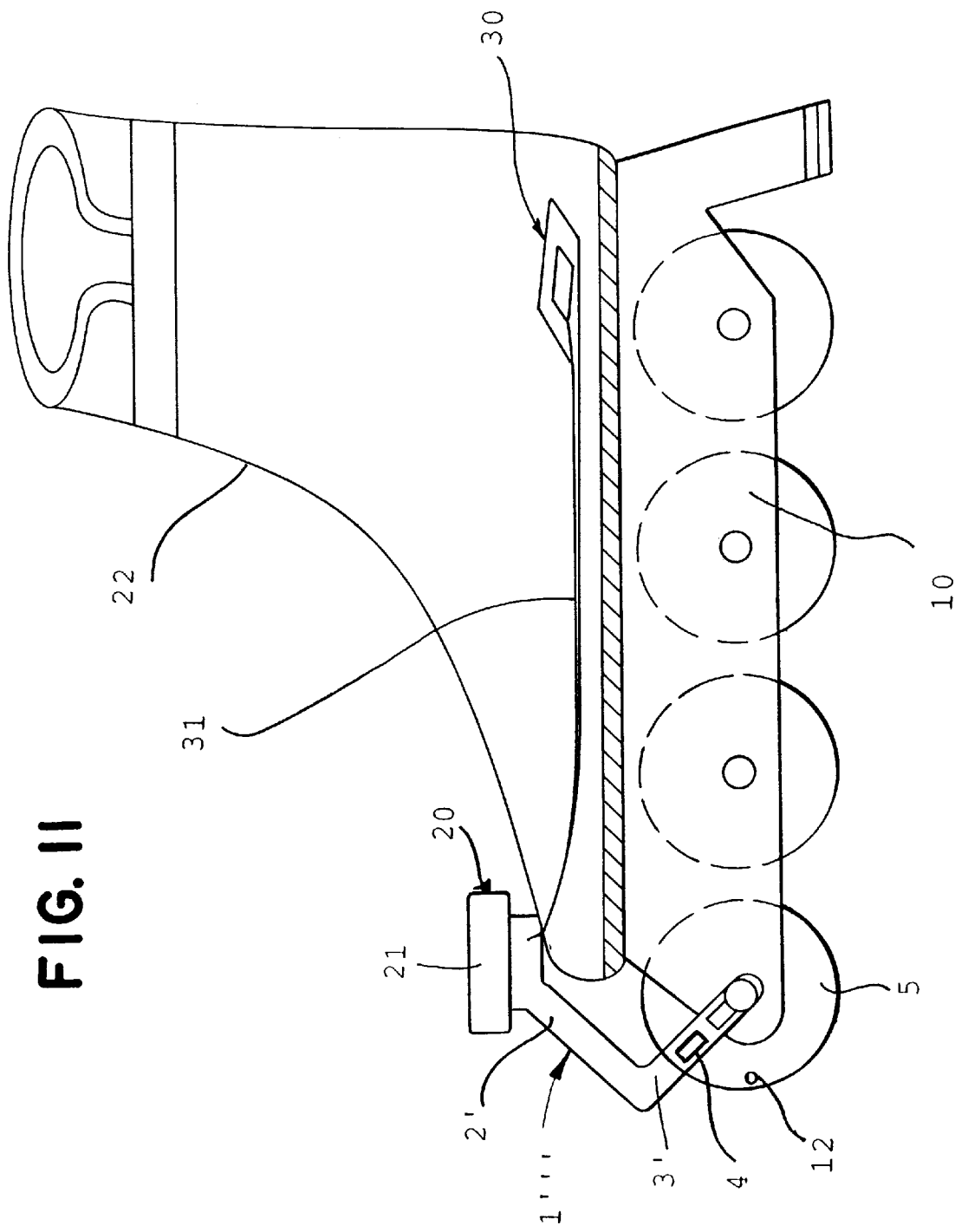
FIG. 11 shows another embodiment of an inventive apparatus and its arrangement on the chassis and boot of an inline skate.

FIG. 11 shows another inventive construction of an apparatus for determining the travel data of a travel device. In this embodiment the correcting device 30, in this case a pressure switch, as well as the reed switch 4 are placed in two constructionally separate sensor units or assemblies 30 and 1'''. The sensor unit or assembly 1''' again has two legs 2', 3' bent at an angle of 120°, like the assembly 1' shown in FIG. 5. The reed switch 4 is located together with the slot 9 in or on the leg 3'. Within the plastic legs 2', 3' is provided the cable for connection to the data processing unit 20. The latter is fitted to the sensor base 19, to which is adjustably articulated the leg 2'. On the top surface of the data processing unit 20 are provided displays 21 for outputting the speed, travel time and path length covered.

The correcting device 30, constructed as a pressure switch, is located within the boot 22, above the boot heel and between the inner boot and the sole of the boot 22, and is connected by cable 31 to the data processing unit 20.

Figure 12:
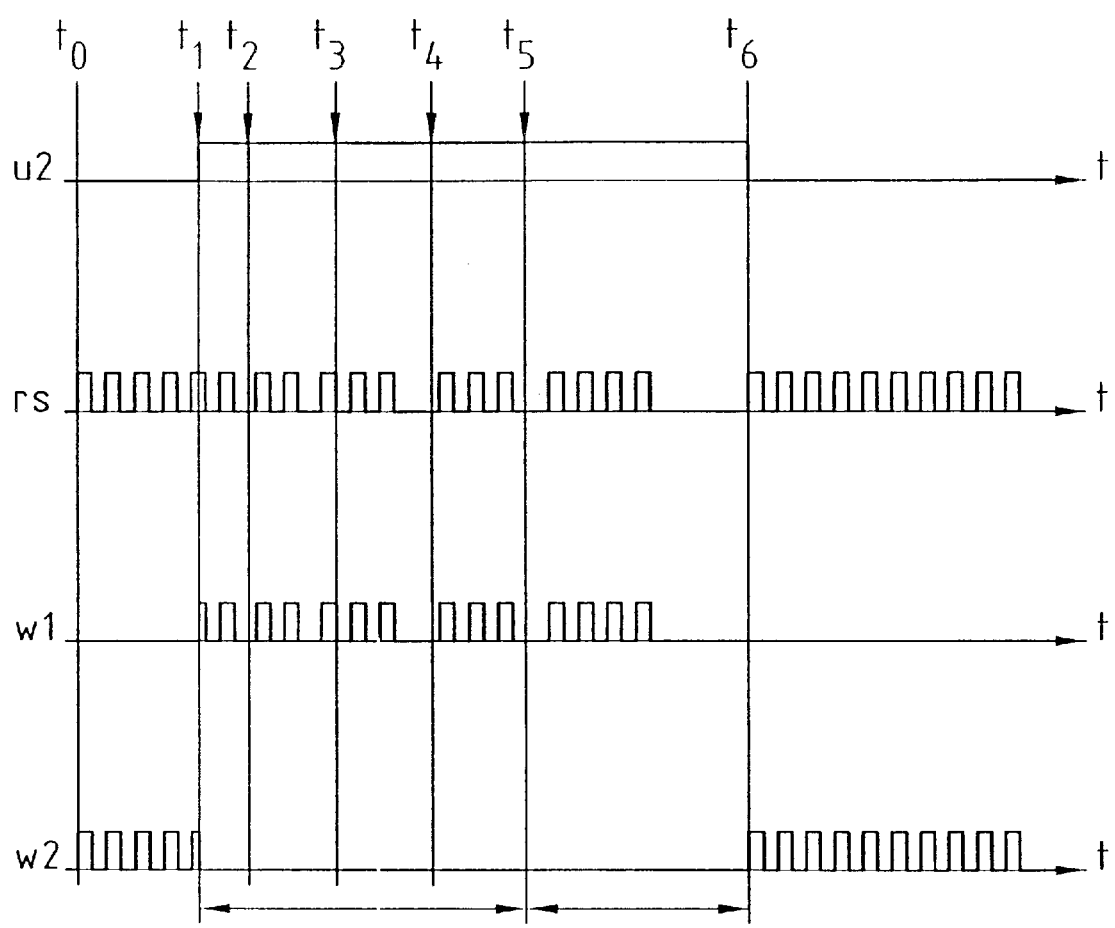
FIG. 12 is a timing chart showing the signals measured during rolling and running movement.

Reference will now be made to FIG. 12 showing a timing chart for determining the path length covered. In FIG. 12 u2 is the signal of the timing element, i.e., the tilt switch or pressure switch, which controls an increase in the indicated path length, rs stands for the pulses measured with the reed switch, and w1 and w2 show how the pulses of the reed switch are associated with a running movement and a rolling movement respectively. w1 relates to the signals associated with the running movement and w2 to those associated with the rolling movement.

In the time interval between $t_0$ and $t_1$, which is the time during ground contact with the at least one measuring roller, the tilt switch detects that there is no tilt of the inline skate to indicate a running step, or the pressure switch detects that the skater exerts pressure on the pressure switch in the interior of the boot, so that a corresponding pressure contact exists. Consequently, signal u2 is not present. Thus, the pulses measured by the reed switch are associated with a rolling movement for determining the number of revolutions of the rollers, as shown by pulses w2, so that the path length covered during ground contact is determined by the number of revolutions, and the actual roller circumference. If at time $t_1$ a signal u2 is transmitted by the tilt switch or by the pressure contact on the pressure switch being interrupted, then timing signal u2 is activated, and the pulses measured by the reed switch for the calculation of the path length covered are associated with running steps w1 when there is intermittently no ground contact of the at least one measuring roller. As is clearly apparent from the signals associated with w1, when there is intermittently no ground contact of the at least one roller, the signals are no longer regular rolling pulses, but instead the pulses are intermittent to indicate step sequences representative of running movement. During this time when the timing element u2 is activated, the indicated path length is increased by a preset value of between 15 and 30%, so as in this way to take into account actual path length traveled when there is no ground contact and when no regular pulses are produced. Time $t_5$ is the last time when a tilt or no pressure contact is detected, and for a further three seconds, until time $t_6$, the calculation takes place of the corrected increased path length. Since during this three seconds no further steps are taken, the timing element u2 is deactivated at time $t_6$, and the path length is determined as its initial measured value. The path lengths subsequently measured with the reed switch are then once again associated with w2, and the calculation of the path length covered takes place based on the initial measured value. As can be gathered from the timing chart, once again pulses are regularly received from the reed switch.

What is claimed is:

1. An apparatus for determining travel data of a travel device, that includes rollers which have intermittent ground contact, at least one of the rollers being a measuring roller, said apparatus comprising:

an odometer adapted to be coupled to the at least one measuring roller to register an initial measured path length; and a correcting device for correcting the initial measured path length for an effect of the intermittent ground contact with the at least one measuring roller, to cause the odometer to register a corrected measured path length which is travelled by the travel device.

2. An apparatus according to claim 1, wherein:

the correcting device includes an inclinometer for determining whether the at least one measuring roller is contacting the ground.

3. An apparatus according to claim 2, wherein:

the correcting device includes a chronometer.

4. An apparatus according to claim 2, wherein:

the odometer and correcting device are located in separate assemblies.

5. An apparatus according to claim 2, wherein:

the odometer comprises a reed switch for detecting revolutions of the at least one measuring roller.

6. An apparatus according to claim 2, wherein:

the odometer and correcting device are combined in a sensor unit formed as an assembly.

7. An apparatus according to claim 2, wherein:

the correcting device includes a data processing unit adapted to be positioned on the travel device.

8. An apparatus according to claim 1, wherein:

the correcting device includes a tilt switch for determining whether the at least one measuring roller is contacting the ground.

9. An apparatus according to claim 8, wherein:

the tilt switch includes a setscrew for setting the tilt switch at a fixed position relative to a part of the travel device.

10. An apparatus according to claim 1, wherein:

the correcting device includes a pressure switch for determining whether the at least one measuring roller is contacting the ground.

11. An apparatus according to claim 10, wherein:

said apparatus further comprises a boot adapted to be connected to the travel device; and the pressure switch is in the boot.

12. An apparatus according to claim 11, wherein:

the boot includes an inner boot and a sole; and the pressure switch is located between the inner boot and the boot sole.

13. An apparatus according to claim 11, wherein:

the boot includes a heel; and the pressure switch is located in an area above the boot heel.

14. An apparatus according to claim 1, wherein:

the odometer comprises a reed switch for detecting revolutions of the at least one measuring roller.

15. An apparatus according to claim 14, wherein:

the correcting device includes a tilt switch for determining whether the at least one measuring roller is contacting the ground.

16. An apparatus according to claim 14, wherein:

the odometer further comprises a magnet adapted to be fixed to the measuring roller to cooperate with the reed switch so as to generate pulses representative of rotations of the at least one measuring roller.

17. An apparatus according to claim 16, wherein:

the magnet is a permanent magnet manufactured from one of neodymium or an aluminum-nickel cobalt alloy.

18. An apparatus according to claim 14, wherein:

the correcting device includes a tilt switch for determining whether the at least one measuring roller is contacting the ground;

the apparatus further comprises a fastening device for fastening the apparatus to the travel device; and the reed switch is positioned between the tilt switch and the fastening device.

19. An apparatus according to claim 18, wherein:

the fastening device includes a leg provided with a slot.

20. An apparatus according to claim 19, wherein:

the leg is bent relative to the reed switch.

21. An apparatus according to claim 14, wherein:

the correcting device includes a tilt switch for determining whether the at least one measuring roller is contacting the ground; and the apparatus further comprises a fastening device positioned between the reed switch and the tilt switch, for fastening the apparatus to the travel device.

22. An apparatus according to claim 14, wherein:

the correcting device includes a tilt switch for determining whether the at least one measuring roller is contacting the ground;

the odometer and the correcting device are combined in a sensor unit formed as an assembly having mutually bent legs; and the reed switch and the tilt switch are located in or on the mutually bent legs of the sensor unit assembly.

23. An apparatus according to claim 1, wherein:

the odometer and the correcting device are combined in a sensor unit formed as an assembly.

24. An apparatus according to claim 23, wherein:

the assembly has legs bent relative to each another.

25. An apparatus according to claim 23, wherein:

the assembly includes a fastening device for fastening the sensor unit to the travel device.

26. An apparatus according to claim 1, wherein:

the correcting device includes a data processing unit adapted to be positioned on the travel device.

27. An apparatus according to claim 26, wherein:

the data processing unit includes a display for displaying data regarding travel of the travel device as determined by processing performed by the data processing unit.

28. An apparatus according to claim 27, wherein:

the display comprises an LCD.

29. An apparatus according to claim 26, further comprising:

a sensor base supporting the data processing unit.

30. An apparatus according to claim 29, wherein:

said apparatus further comprises a boot adapted to be connected to the travel device; and the sensor base is fixed to the boot.

31. An apparatus according to claim 29, wherein:

said apparatus further comprises a holder adapted to be fixed to the travel device; and the sensor base is located on the holder.

32. An apparatus according to claim 31, wherein:

the holder is adapted to be fixed between the boot and a chassis of the travel device.

33. An apparatus according to claim 32, wherein:

the holder is adapted to engage laterally over the boot.

34. An apparatus according to claim 33, wherein:

the holder is adapted to engage over a toe of the boot.

35. An apparatus according to claim 23, wherein:

said apparatus further comprises a sensor base; and the assembly is fastened to the sensor base.

36. An apparatus according to claim 1, wherein:

the correcting device includes a chronometer and a device for determining a number of revolutions of the measuring roller.

37. A method of determining travel data of a travel device that includes rollers which have intermittent ground contact, at least one of the rollers being a measuring roller associated with an odometer, the method comprising:

during movement of the travel device, correcting an initial measured path length for an effect of the intermittent ground contact by the at least one measuring roller to provide a corrected measured path length traveled by the travel device during movement which includes the intermittent ground contact.

38. A method according to claim 37, further comprising:

detecting the intermittent ground contact by detecting when tilt of the travel device with respect to a rolling direction is approximately 30° to establish that the at least one measuring roller no longer has ground contact.

39. A method according to claim 38, further comprising:

determining the initial measured path length covered during a time interval based on a stored roller circumference and a number of revolutions of the at least one measuring roller occurring during the time interval.

40. A method according to claim 37, further comprising:

detecting the intermittent ground contact by detecting an interruption of pressure exerted on the travel device during ground contact to establish that the at least one measuring roller no longer has ground contact.

41. A method according to claim 37, further comprising:

determining the initial measured path length covered during a time interval based on a stored roller circumference and a number of revolutions of the at least one measuring roller occurring during the time interval.

42. A method according to claim 37, wherein:

the initial measured path length is corrected upon detecting of any interruptions of ground contact by the at least one measuring roller by increasing the initial measured path length for the interruption time interval by a correction value of 15 to 30% to provide the corrected measured path length.

43. A method according to claim 42, wherein:

the correction value on detection of the interruption of the at least one measuring roller from the ground contact is maintained for at least three seconds.

44. A method according to claim 37, further comprising:

determining the initial measured path length from a number of revolutions of the at least one measuring roller.

45. A method according to claim 38, wherein:

the initial measured path length is corrected upon detecting of any interruptions of ground contact by the at least one measuring roller by increasing the initial measured path length for the interruption time interval by a correction value of 15 to 30% to provide the corrected measured path length.

46. An apparatus according to claim 1, wherein:

the odometer and correcting device are located in separate assemblies.

* * * * *